July 27, 1926.

H. MORTENSON 1,593,666

VEHICLE BRAKE AND BUMPER

Filed Jan. 17, 1924   2 Sheets-Sheet 1

INVENTOR
Hans Mortenson.
BY
Thomas Attill
ATTORNEY

July 27, 1926.

H. MORTENSON

VEHICLE BRAKE AND BUMPER

Filed Jan. 17, 1924

1,593,666

2 Sheets-Sheet 2

INVENTOR
Hans Mortenson.
BY
Thomas A. Hill.
ATTORNEY

Patented July 27, 1926.

1,593,666

UNITED STATES PATENT OFFICE.

HANS MORTENSON, OF BROOKLYN, NEW YORK.

VEHICLE BRAKE AND BUMPER.

Application filed January 17, 1924. Serial No. 686,798.

My invention relates to improvements in vehicles and more particularly has reference to means in combination therewith for stopping the vehicle, preventing others from bumping into the wheels thereof, and for elevating the wheels clear of the ground for repairs, for removing the tires, and for relieving the same of the weight of the vehicle when in storage.

Figure 1:
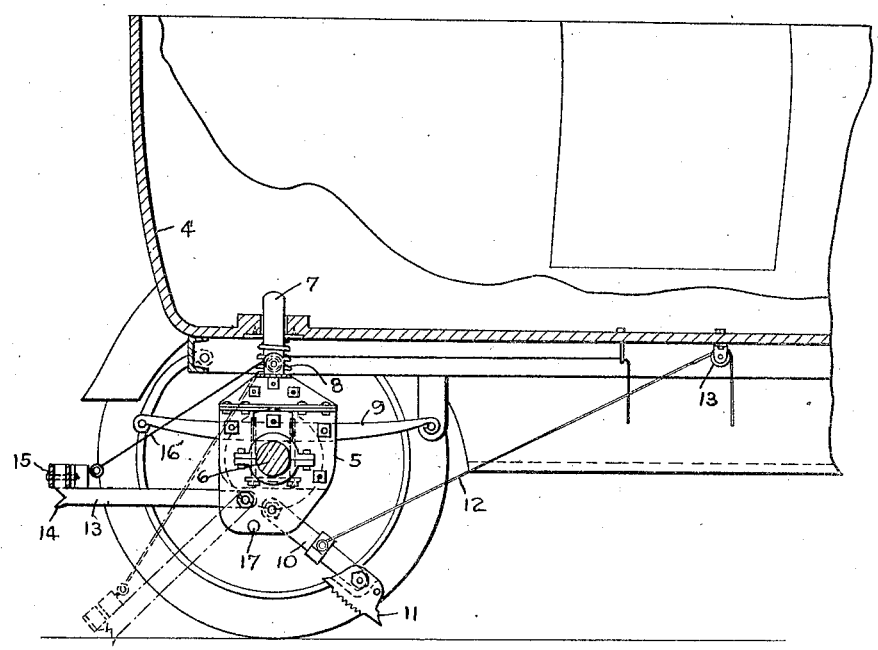
Figure 2:
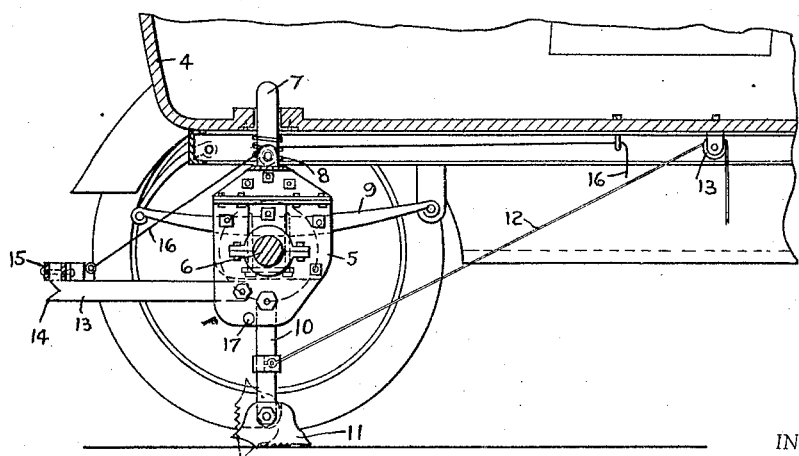
Figure 3:
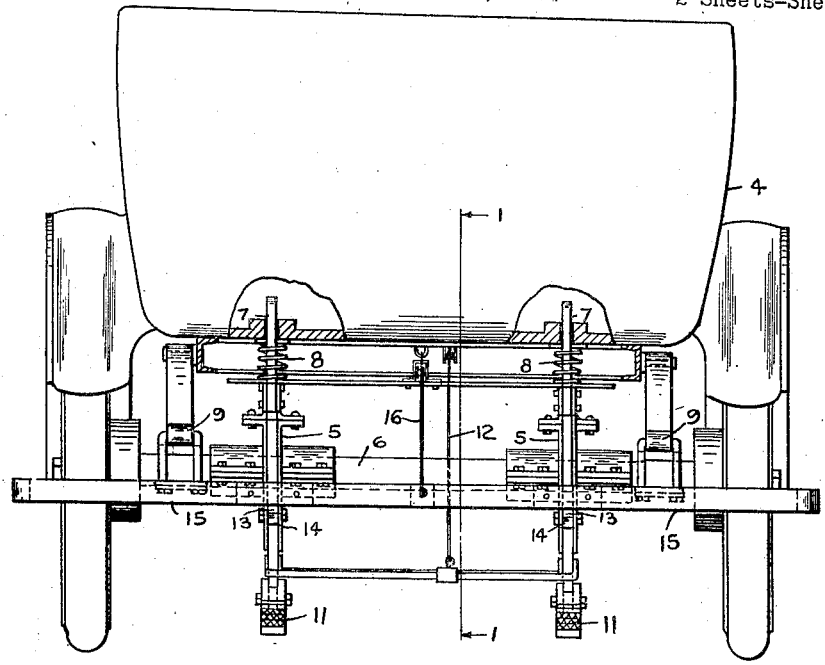

In the accompanying drawings, I have illustrated in Fig. 1, partly in longitudinal section, a suitable form of vehicle embodying an application of my invention. Fig. 2 is a similar view, parts broken away, and Fig. 3 is a rear view with parts broken away.

4 is the body of the vehicle, and 5 are fabricated sections through which the axle 6 passes, said fabricated sections being provided with upwardly projecting portions 7 around which are provided springs such as 8, thus providing resilient support for the vehicle independently of the usual springs such as 9 and also preventing lateral movement of the body of the vehicle. The fabricated sections also provide support for the pivoted legs 10 upon the ends of which are provided pivoted shoes 11 adapted to engage the ground, and 12 indicates a suitable cable adapted to pass over the pulley 13 and to the front or any other convenient part of the vehicle where when the same is drawn the shoe 11 is lifted clear of the ground and when released engages the ground, allowing the vehicle to be moved forward until the legs 10 striking a pin such as 17 take the entire support thereof, thereby clearing the wheels, making it convenient for changing the tires, repairs, or for relieving the tires of the weight of the vehicle when in storage. By pushing the vehicle backward a short distance the weight of the same is taken off the legs 10 and by pulling up on the cable 12 the same may be made fast so that the shoes 11 sufficiently clear the ground to avoid any interference.

13 indicate other legs preferably provided with pointed ends or toes 14, and 15 indicates a bumper or fender connecting the same as shown. These are operated by a cable 16 which may also extend to the front of the car or in any other suitable position, so that by pulling upon the same, the fender can be placed in position as shown, and by releasing the same, it will drop down as shown in dotted outline in Fig. 1, so that in the event of the car backing such as upon a down grade, an effective and substantial brake or stop is provided for, thereby preventing catastrophe, the pin 17 serving as a stop to limit the movement of the legs 13, whereas when not in use, by elevating the same to the position shown in full outline, a substantial form of bumper is provided for at the back of the car to prevent another coming up in the rear from jamming the wheels or body of the car.

It will of course be understood that the legs 13 may also be used for supporting the car in place of the legs 10 so as to provide three functions for said legs instead of providing the extra attachment 10—11 when desired.

Of course it will be understood that various modifications may be made in the construction and arrangement of parts without departing from the spirit of the invention as claimed.

I claim:—

1. In combination with a vehicle of the class described, a braking device adapted when applied to lift the vehicle clear of the ground and when not so applied to serve as a bumper therefor, and in combination therewith means for preventing said vehicle from moving laterally.

2. In combination with a vehicle of the class described having an axle, a braking device adapted when applied to lift the vehicle clear of the ground and when not so applied to serve as a bumper therefor, and in combination therewith means for preventing said vehicle from moving laterally and a housing around the axle of said vehicle providing support for said device and for said means.

3. In combination with a vehicle of the class described having an axle, a braking device adapted when applied to lift the vehicle clear of the ground and when not so applied to serve as a bumper therefor, and in combination therewith means for preventing said vehicle from moving laterally and a housing around the axle of said vehicle providing support for said device.

In testimony whereof I hereunto affix my signature.

HANS MORTENSON.